Oct. 16, 1934.  H. M. NEWTON  1,977,080
APPARATUS FOR MAKING FLOORING
Original Filed Sept. 8, 1931   4 Sheets-Sheet 1
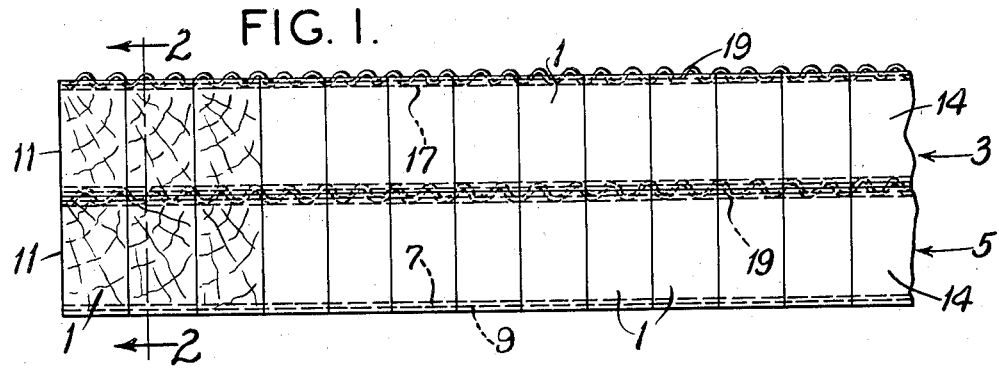
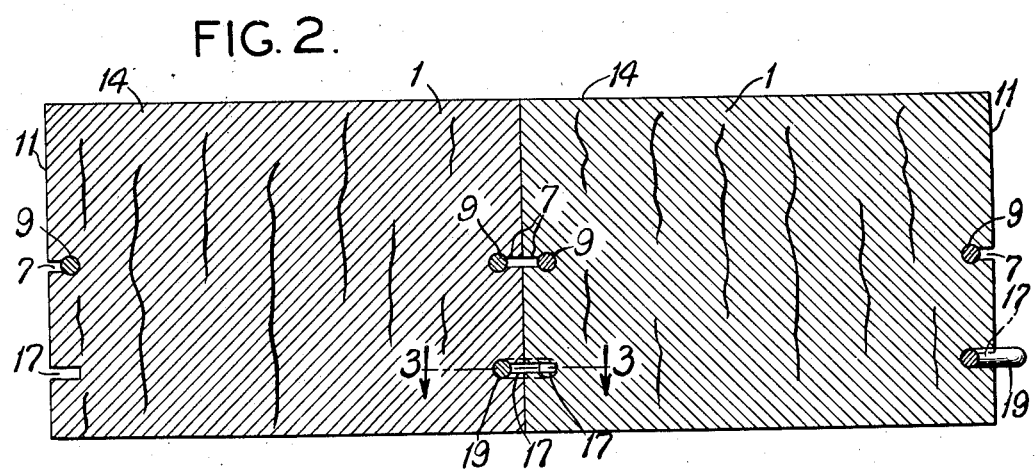
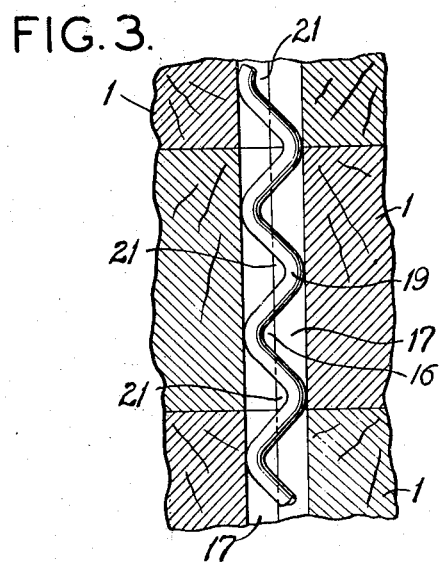
Harold M. Newton,
Inventor
Delos G. Haynes,
Attorney Oct. 16, 1934.       H. M. NEWTON       1,977,080
APPARATUS FOR MAKING FLOORING
Original Filed Sept. 8, 1931     4 Sheets-Sheet 2
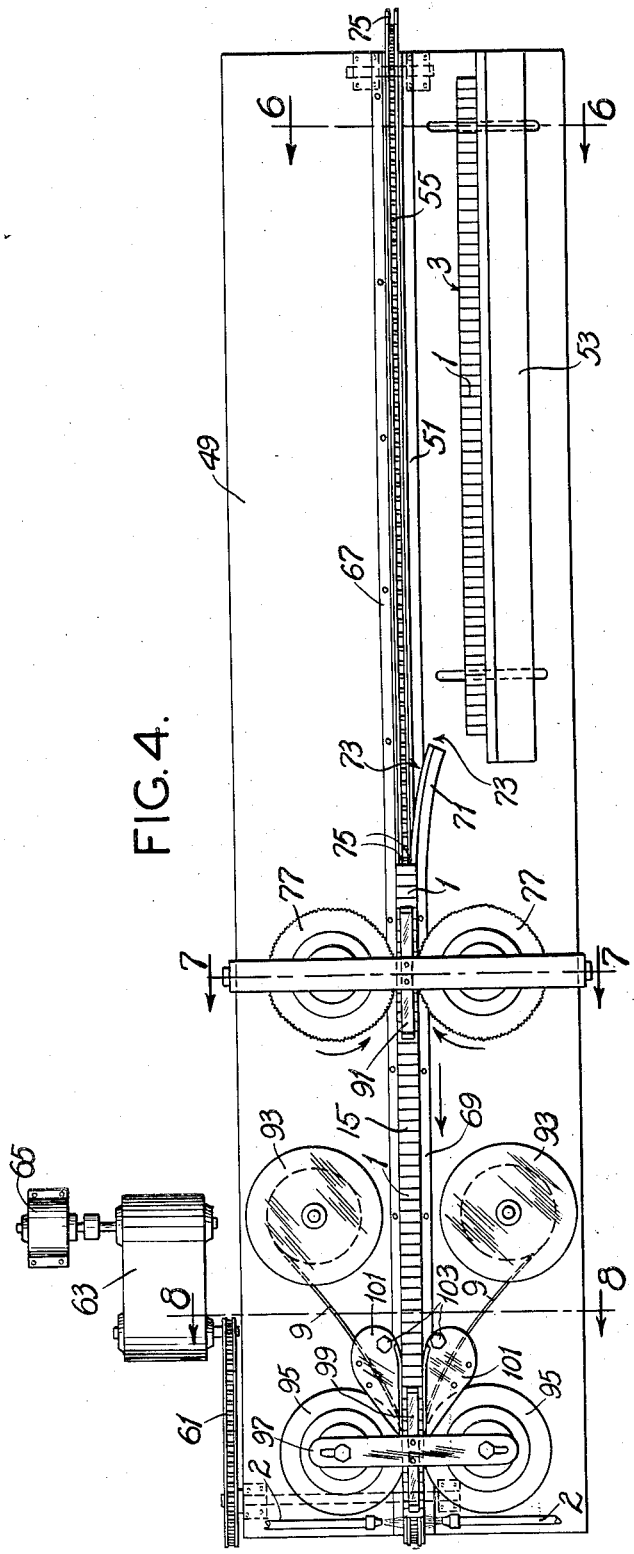
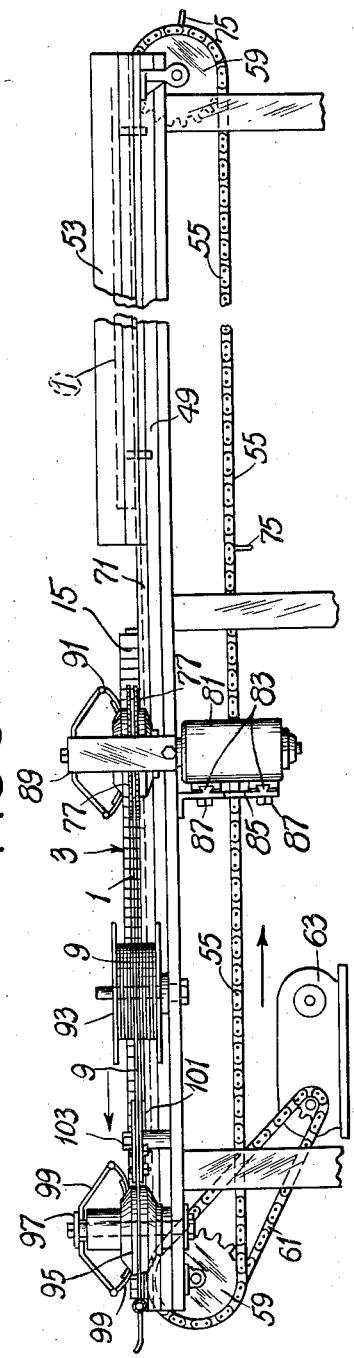
Harold M. Newton,
Inventor.
Delos G. Haynes,
Attorney.

Oct. 16, 1934.  H. M. NEWTON  1,977,080
APPARATUS FOR MAKING FLOORING
Original Filed Sept. 8, 1931  4 Sheets-Sheet 3
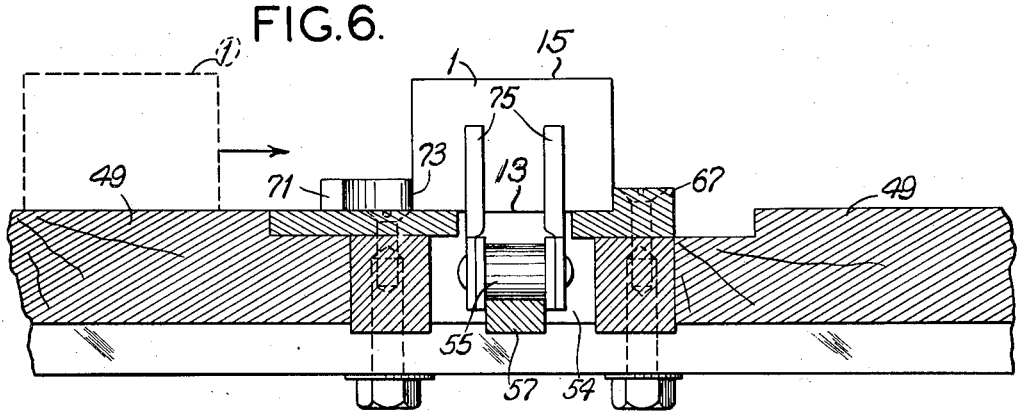
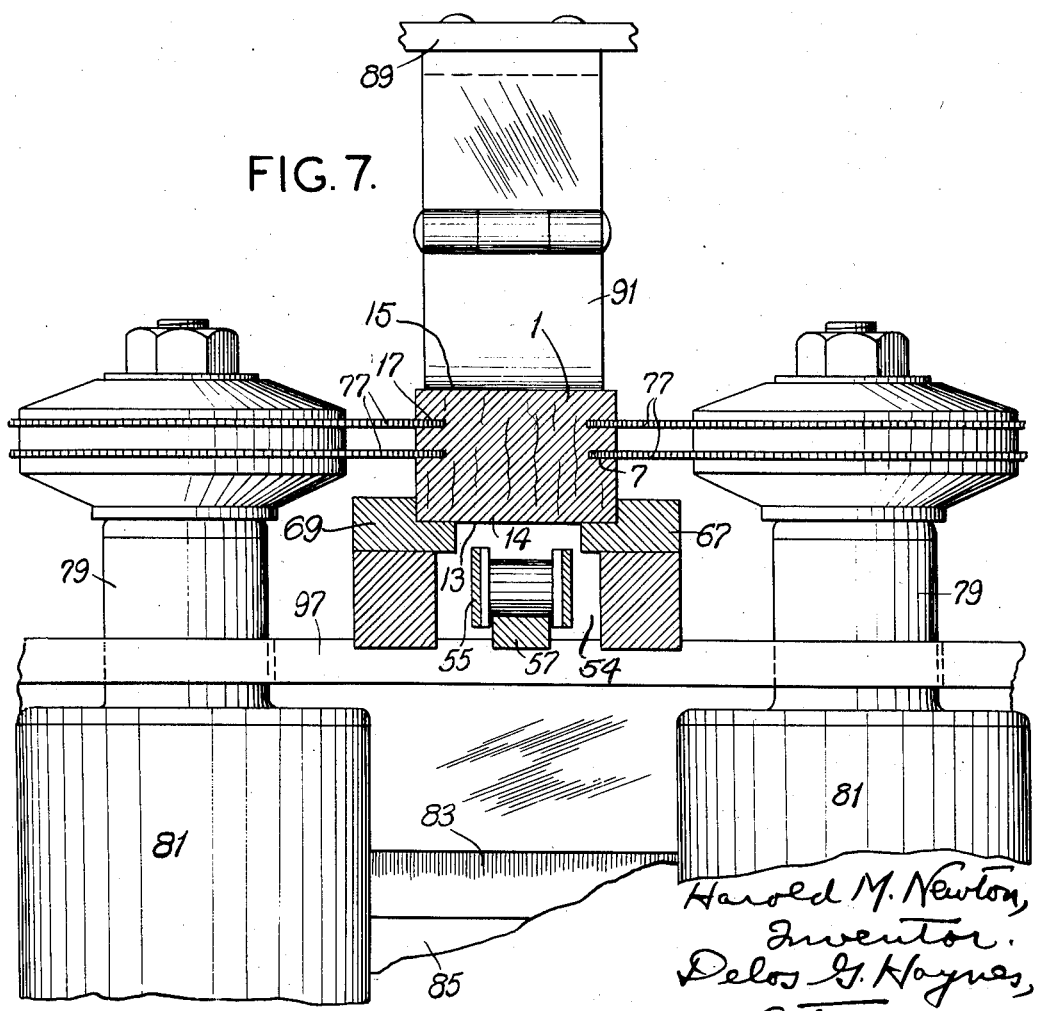

Patented Oct. 16, 1934

1,977,080

UNITED STATES PATENT OFFICE 1,977,080

APPARATUS FOR MAKING FLOORING

Harold M. Newton, Clayton, Mo., assignor to The Midland Creosoting Company, Toledo, Ohio, a corporation of Ohio Original application September 8, 1931, Serial No. 561,655, now Patent No. 1,902,716, dated March 21, 1933. Divided and this application March 16, 1933, Serial No. 661,035

3 Claims. (Cl. 144—3)

This invention relates to a method of, and apparatus for making flooring of the type set forth in my Patent 1,902,716, for Flooring, dated March 21, 1933.

This application is a division of my said Patent 1,902,716, dated March 21, 1933.

Among the several objects of the invention may be noted the provision of an improvement in assembling into strips of suitable length blocks, said blocks being arranged to present an end-grain surface for resisting wear said strips being keyed one to another; and the provision of an improved method and apparatus for forming the product having the above and other improved characteristics. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which are illustrated several of various possible embodiments of the invention, Fig. 1 is a plan view showing a fragmentary section of laid flooring;

Fig. 2 is an enlarged cross section taken substantially on line 2—2 of Fig. 1;

Fig. 3 is a horizontal section taken substantially on line 3—3 of Fig. 2;

Fig. 4 is a plan view of a machine adapted to carry out the method herein described and to produce the article set forth;

Fig. 5 is a side elevation of Fig. 4;

Fig. 6 is an enlarged cross section taken substantially on line 6—6 of Fig. 4;

Fig. 7 is a cross section taken substantially on line 7—7 of Fig. 4;

Similar reference characters indicate corresponding parts throughout the several views of the drawings.

Wood blocks, cut to present end grain to wear, when applied individually to a floor or pavement are substantially as uneven as the floor itself. Attempts have been made to provide smoothness by bridging over the hollow spaces in a rough floor or the like by applying to the bottom of the blocks a layer of longitudinally grained wood or the like, tongue-and-grooved to the blocks. Successive strips of blocks thus assembled were keyed and splined by means of grooved, wooden tongues. Some of the disadvantages of this form are the expense and complication of construction involved, and the fact that the longitudinally grained flooring beneath the end grained blocks warps the surface out of shape; and the construction is heavier. Furthermore, it has not been easy to follow the contour of the floor, because of the inflexibility of this form of flooring.

Flat metal tongues are found to be heavy and difficult of placement in the blocks and they are not properly held in place by the blocks.

Dowels placed in through holes are not satisfactory because of the expense of construction and the weakening of the blocks by the through holes necessary for accommodating the dowels. The present invention provides for working and keying the block at a region where the weakening effect is negligible, the key itself having an improved form for improved cooperation in the flooring.

The present invention overcomes the above and other difficulties encountered with prior types of this flooring.

Referring now more particularly to Figs. 1 to 3, numeral 1 refers to rectangular blocks which are adapted to lie with the end grain vertically disposed, as shown. These blocks are arranged in rows as indicated by numerals 3 and 5, each row being originally made up separately as an organization of blocks constituting a strip.

As shown in Figs. 2 and 3, each row of blocks or strip is provided with longitudinally arranged side grooves 7 having, for example, a width of 14 gage (.083 inch). These grooves are formed while the blocks are aligned side-by-side and turned up-side-down on a flat surface, whereby the subsequent upper floor surface is rendered accurate. The grooves 7 are accurately spaced from the tops of the blocks, as are all of the other grooves herein described. The spacing from the bottom is also substantially accurate but this latter accuracy depends upon the accuracy with which the blocks were originally sawed to length. The means by which these relative accuracies are accomplished and the purpose therefor will be clarified hereinafter in describing the method and apparatus employed. This means is part of the subject-matter of this divisional application.

Figure 8:
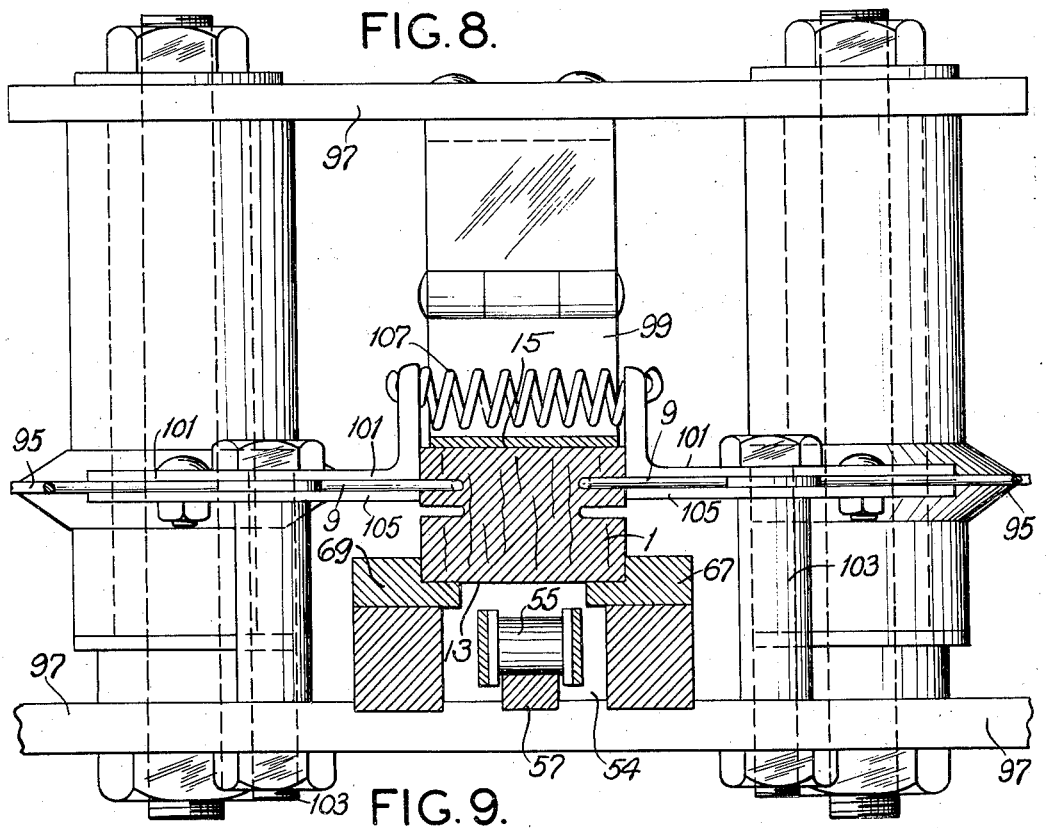
Fig. 8 is a cross section taken substantially on line 8—8 of Fig. 4.
Figure 9:
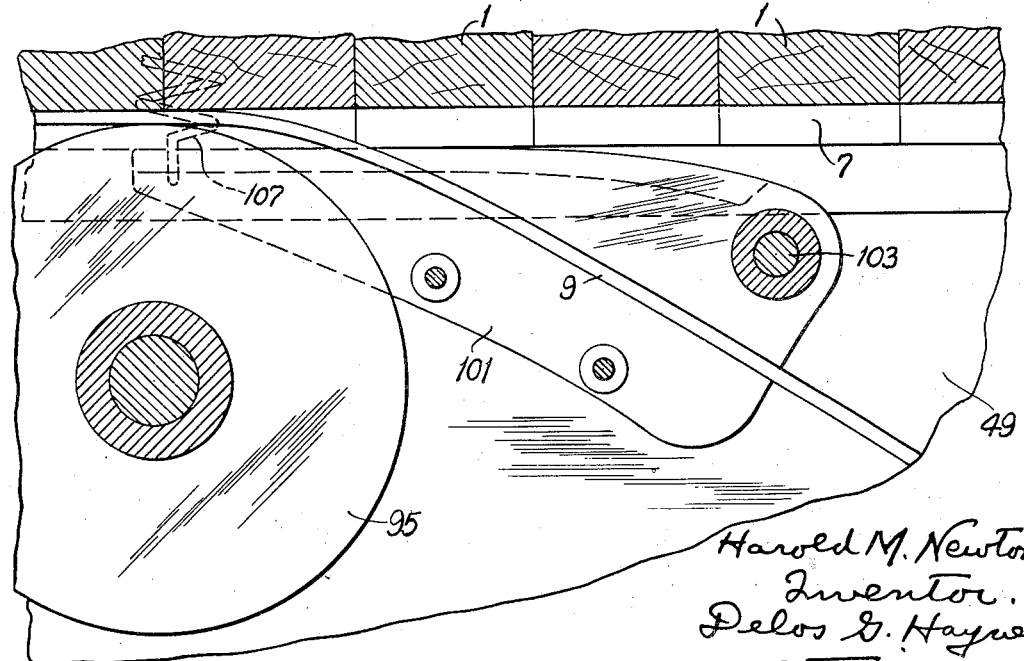
Fig. 9 is an enlarged plan view showing details of certain wire guide shoes.

Into each groove 7, while the blocks of a given row are aligned and lying side by side, up-side-down on the level surface is forced a length of wire, as illustrated in Figs. 8 and 9. The wire is of larger gage than the groove, for example, in the case of the groove above set out a 9 gage wire (.148 inch) is suitable. The wire being substantially larger than the groove, it is necessary that it be pressed in with some force that it may be driven into the position shown in Fig. 1. The depth of the groove 7 is greater than the diameter of the wire 9, so that the wire sinks below the outer aligned faces 11 of a given row of blocks. This provides adequate material for subsequent finishing after wire placement.

Because of the springiness of the end grain fiber of the wood, the groove tends to close in over the wire, thus positively holding the wire in place and providing a compressive effect around the wire which prevents the blocks from sliding longitudinally thereon. The closing-in effect of the wood around the wire may be enhanced by spraying water or the like on the groove before or after the wire is placed, thus swelling the fibers so that they more readily assume their original set after having been forced apart by the wire. This procedure is however not absolutely necessary. It is indicated at numeral 2 in Fig. 4.

In the above manner the blocks 1 are to be juxtaposed in permanent rows or strips or units.

In order that adjacent strips or rows 3, 5 may be aligned and fastened by splining, I provide a second set of grooves 17. One of these is to function as a groove to receive a tongue or spline member 19 fastened in an adjacent strip. The tongue member 19 preferably comprises a length of crimped wire having an undulating or waveshape, the troughs 16 of which are forced into one groove of a given strip 5, and the crests 21 of which extend therefrom and are adapted to be forced into the groove 17 of the adjacent strip 3 when the floor is laid. The relationship between the dimensions of the groove 17 and of the tongue 19 is of the order of that set out for the grooves 7 and wires 9. Thus the fibers of the wood spring in over the troughs and crests of the undulation of the splined wire, so as to effect a tight splining between the successive strips 3, 5.

It is clear from the above, that each assembled strip carries a blank groove 17 on one side, and a groove 17 on the other side in which is pre-positioned the spline wire 19.

In Figs. 4–9 is shown an exemplary machine for carrying out the manufacture of the product. The apparatus comprises a platen 49 having a machined surface 51 of a length adapted to have pushed thereover a series of blocks 1, this being done by means of a suitable pusher 53. A slot 54 arranged centrally of the platen 49 has a movable roller conveyor chain 55 therein riding upon a suitable supporting rack 57. The upper reach of this chain moves forwardly (to the left in Fig. 4) and the lower reach rearwardly, the whole chain being carried upon sprockets 59 at the front and rear of the machine. A drive chain 61 and speed reducing unit 63 are interposed between a suitable driving motor 65 and the front sprocket 59, whereby the chain is given the motion described.

The slot 54 has formed completely along one side a guide 67, against which the manually placed line of blocks 1 may be pushed by the pusher 53. On the opposite side of the slot 54 is a second guide 69 which is flared rearwardly as indicated at numeral 71 to provide an opening 73 through which the blocks 1 may be pushed laterally in order to bring them into the guides 67, 69.

It is to be understood that the row of blocks 1 which is manually placed ahead of the pusher 53 is normally about eight to ten feet long or may comprise any other length desired. The opening 73 is adapted to whatever length of strip is chosen. Likewise, the chain 55 carries a spaced set of dogs 75, in front of which the manually placed series of blocks 1 are pushed. Thus the dogs 75 are spaced apart a distance which is somewhat greater than the desired length of the final strips.

Forwardly of the flare 71 and of the point where the blocks 1 are definitely guided between the guides 67 and 69, there are arranged laterally pairs of motor driven saws 77 which are carried on the vertical shafts 79 of vertical motors 81, the latter having dove-tail connections 83 with a cross plate 85 so that they may be laterally adjusted. Suitable locking bolts 87 are used to hold the motors in their respective adjusted positions.

Between and above the saws and depending from a bracket 89 is a spring holding shoe 91 which insures that the bottom faces 13 of the blocks are positively pushed down on the guides 67 and 69. This insures accuracy of the saw cuts with respect to the said lower faces or surface 14 which are to become the upper surface of the floor (see Figs. 1, 2 and 3.) Slight inaccuracies in the now upper surfaces 15 of the blocks (later to be the lower surface of the floor) are compensated for by the spring 91. The fact that these irregularities may appear in the final product because of irregular lengths of blocks, is of no consequence because of the advantageous suspension effect of the wires.

The adjustability of the motors is provided for the purpose of obtaining different grooving locations in order to accommodate different sizes of blocks. The guides 67 and 69 are also laterally adjustable to accommodate different sizes of blocks. Vertical adjustment of groove position is obtained by spacing the saws on their mandrels in the known manner indicated in the drawings.

After the strips of blocks leave the saws, they pass forwardly between a set of wire feeding spools 93 and in between wire forcing or presser discs 95. These discs 95 are also arranged for lateral adjustment on brackets 97. The discs 95 are adjusted to extend into the grooves 7 to apply the straight wire to the bottom of its respective groove (Fig. 9). The discs are approximately equal to the wire diameter, or may be of slightly less thickness. The edges are concave, as shown in Fig. 8.

At the discs or rolls the moving strip is again pressed down into solid, accurate contact with the guides, this being done by means of a second pressure spring 99.

In order that it be certain that each wire shall enter the groove and be located between the groove and the disc 95, I provide directly behind the discs 95 a set of wire guide shoes 101 pivoted at point 103 and comprising space plates 105, one of which is above and the other of which is below its respective disc 95. The space between the plates 105 is only slightly greater than the thickness of a pressure disc and also slightly greater than the thickness of a wire 9 which is being forced. The elevation of the two is such that the space between the plates 105 is juxtaposed with respect to the then through-going saw cuts 7. The wires from the spools 93 are threaded through the space between the plates 105 of the shoes.

Two shoes are normally held together in the path of the moving strip, this being done by means of a spring 107. When the strips come through, the shoes are pushed apart, the upper and lower plates thereof sliding above and below their respective pressure discs 95 but at the same time holding the wires in the proper plane to be fed into the groove 7 by means of said discs.

After the strips leave the pressure discs, they are delivered from the machine ready to be sanded and/or otherwise treated.

The application of the crimped wires may likewise be made on the present type machine by providing pressure discs 95 having convoluted peripheries, or they may be made on a similar machine into which the strips are fed, or they may be applied manually. They are more readily applied manually than the straight wire because it is more convenient to force the wire to the bottom of the groove. This can be done by tapping the crimped wire with a hammer and a setting tool.

It is clear from the above, that the pressure discs comprise idle members having concave peripheries of approximately the contour of the wire. As stated, they should be no wider than the wire and preferably should be narrower so that when the wheels follow the wire into the wood they will not enlarge the groove unnecessarily, thus permitting a maximum degree of reshaping of the wood to the original condition.

It will be noted that as the blocks leave the machine, the conveyor chain dogs drop out of registry with the strips in passing to the return reach.

It will also be seen that unless separated, the successive strips are joined by the wires 9. These may be manually sheared or otherwise broken, either flush with the ends of the strip, or enough loose wire may be left so that the front and rear ends may be turned over to form the clamps.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawings shall be interpreted as illustrative and not in a limiting sense.

I claim:
1. Apparatus of the class described comprising a table, longitudinal guide means thereon, said table having an opening between the guide means, means for introducing rows of blocks into the guide means, a movable chain in said opening, means associated with said chain for driving said blocks through the guide means, at least one saw adapted to cut aligned grooves in the blocks as they are driven to the guide means, continuous wire feeding means for feeding a continuous length of wire, and at least one pressure means adapted to continuously press said wire to the groove as said blocks move through the guides.

2. Apparatus of the class described comprising a table, longitudinal guide means thereon, said table having an opening between the guide means, means for introducing rows of blocks into the guide means, a movable chain in said opening, means associated with said chain for driving said blocks through the guide means, at least one saw adapted to cut aligned grooves in the blocks as they are driven to the guide means, continuous wire feeding means for feeding a continuous length of wire, and at least one pressure means adapted to continuously press said wire to the groove as said blocks move through the guides and means for continuously guiding said wire between the pressure means and said groove as it comes from the wire feeding means.

3. Apparatus of the class described comprising a table, longitudinal guide means thereon, said table having an opening between the guide means, means for introducing rows of blocks to the guide means, a movable chain in said opening, means associated with said chain for driving said blocks through the guide means, at least one saw adapted to cut aligned grooves in the blocks as they are driven to the guide means, continuous wire feeding means for feeding a continuous length of wire, at least one pressure means adapted to continuously press said wire into the grooves as said blocks move to the guides, means for guiding said wire between the pressure means and grooves as it comes from the wire delivery means and means for pressing the blocks against the guides at the regions of the saw means.

HAROLD M. NEWTON.